United States Patent
Vitel et al.

(10) Patent No.: US 6,220,635 B1
(45) Date of Patent: Apr. 24, 2001

(54) ASSEMBLY SET UP BETWEEN TWO PIPES, AND APPLIED PIPE ASSEMBLES

(75) Inventors: Jean-Pierre Vitel, Thiaucourt-Regnieville; Noel Favier, Dieulouard; Andre Schneider, Pont-a-Mousson; Didier Lescot, Toul; Rene Bourgin, Montauvile, all of (FR)

(73) Assignee: Pont-a-Mousson SA, Nany (FR)

( * ) Notice: Subject to any disclaimer, the term of this patent is extended or adjusted under 35 U.S.C. 154(b) by 0 days.

(21) Appl. No.: 09/121,840

(22) Filed: Jul. 24, 1998

(30) Foreign Application Priority Data

Jul. 25, 1997 (FR) .................................. 97 09518

(51) Int. Cl.$^7$ ........................................ F16L 17/02
(52) U.S. Cl. .................... 285/337; 285/906; 285/910
(58) Field of Search .................... 285/337, 906, 285/910, 368

(56) References Cited

U.S. PATENT DOCUMENTS

| 2,009,744 | * | 7/1935 | Pfefferle .............................. 285/337 |
| 2,328,168 | * | 8/1943 | Risley ................................. 285/337 |
| 2,474,880 | * | 7/1949 | Woodling ............................. 285/337 |
| 2,792,240 | * | 5/1957 | Risley et al. ......................... 285/337 |
| 5,100,183 | * | 3/1992 | Montesi et al. ....................... 285/337 |

FOREIGN PATENT DOCUMENTS

| 2010 020 | | 9/1970 | (DE) . |
| 195 25 157 | | 7/1995 | (DE) . |
| 1 555 582 | | 7/1967 | (FR) . |
| 2 357 810 | | 1/1977 | (FR) . |
| 2627572 | * | 8/1989 | (FR) .................................. 285/337 |
| 1185766 | * | 3/1970 | (GB) .................................. 285/337 |
| 2251905 | * | 7/1992 | (GB) .................................. 285/337 |
| 2272248 | * | 5/1994 | (GB) .................................. 285/337 |

* cited by examiner

Primary Examiner—Dave W. Arola
(74) Attorney, Agent, or Firm—Sughrue, Mion, Zinn, Macpeak & Seas, PLLC

(57) ABSTRACT

A device 7 for the assembly of a straight spigot 1 and a flange 3 of two pipe elements 2, 4, containing an axial compression sealing elastomer gasket 8. The gasket has a support body 15 bearing against a counter flange 11 to apply pressure to the gasket. To the front of the body 15, and interdependent of it, is a support heel 16 for bearing against the flange. A radial exterior surface 22 of the body is designed to rest on a reaction surface 27, 27a of the counter flange, a radial interior surface 18 of the body is designed to rest on the radial exterior surface 20 of the straight spigot, and a forward surface 31 of the heel is designed to press against the flange to insure the waterproofness of the assembly. The body has at least one recess 26 for the expansion of the elastomer of the pressurized gasket, and the device is fitted with a ring 9 to limit the radial expansion of the heel toward the exterior.

17 Claims, 3 Drawing Sheets

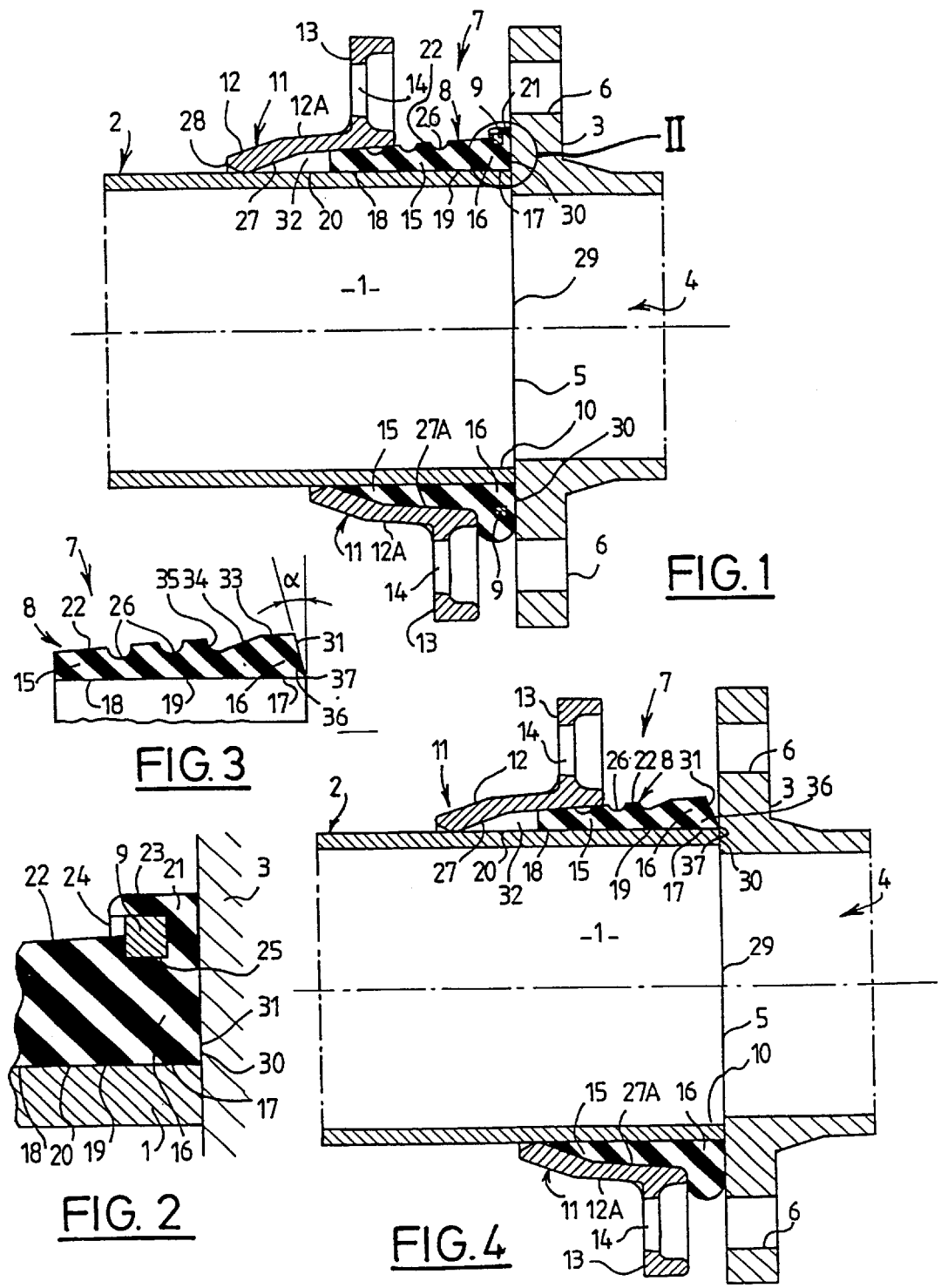

ASSEMBLY SET UP BETWEEN TWO PIPES, AND APPLIED PIPE ASSEMBLES

BACKGROUND OF THE INVENTION

This invention relates to a device for the assembly of a straight spigot and flange of two pipeline elements, containing an annular axial compression elastomer sealing gasket, this gasket containing a support body for bearing against a pressure counter flange, and in front of this body and interdependent of this body, a support heel for bearing against the flange. An exterior radial surface of the body is designed to rest on the reaction surface of the counter flange; an interior radial surface of the body is designed to rest on the exterior radial surface of the straight spigot; and a forward surface of the heel is designed to press against the flange to insure waterproofness of the assembly of the two pipeline elements.

The words forward and backward are to be understood to refer to the direction of movement of the counter flange during the compression of the gasket.

Such a device is used to assemble pipes, notably ductile cast iron pipes, or for the assembly of a pipe with plumbing such as a shutoff valve. For such an assembly, the counter flange and then the gasket are generally inserted over the straight spigot of a first pipe. Then this is brought close to the flange of another pipe or of a plumbing device. The counter flange is generally linked to the flange by bolts, which, when tightened, bring the flange closer to the counter flange and thus ensure the compression of the gasket. The gasket body then lodges itself in the annular compression chamber delimited by the counter flange reaction surface and the radial exterior surface of the straight spigot.

The sealing gasket must function well in the event that the radial play between the counter flange and the straight spigot and/or the axial play between the flange and the straight spigot are substantial, or in the event that such plays are minimal, in order to be able to adapt to the various configurations generally encountered.

However, these requirements are hardly compatible. Actually, in the first case, the space available for the expansion of the elastomer of the compressed gasket is relatively great. Later on, this gasket must have sufficient size to insure proper function. However, in the second case, the space available for the expansion of the elastomer is relatively small. Then we very frequently notice, especially when radial play is minimal, a poor positioning of the gasket during the compression, notably between the heel and the flange, which leads to weak waterproofness.

For a locked assembly between two pipeline elements, inserts are generally provided in a section of the rear extremity of the body, each insert presenting an interior radial surface into which a catching relief is designed to bear against the exterior radial surface of the straight spigot of the first pipe to lock the two pipes together.

When the play is minimal, notably at minimal radial play, we also notice problems in the positioning of the gasket with, for example, the appearance of rolls of elastomer expansion on the outside of the counter flange, on the rear of the counter flange, and/or with undulation of the elastomer around inserts, which can lead to weak waterproofness between the pipes.

SUMMARY OF THE INVENTION

It is the goal of this invention to resolve these problems and to, in particular, furnish a device for a sealing gasket that is easy to install and uninstall, takes up little space, is of low cost, and which insures a good waterproofness between pipe elements with a large range of plays between the assembly elements, and up to relatively high pressures, for example up to 16 bars.

To this effect, the invention has for a goal a device for the assembly of a straight spigot and a flanged end of two pipeline elements, containing an axial compression sealing elastomer gasket, this gasket containing a support body for bearing against a pressure counter flange, and to the front of this body and interdependent of it, a support heel for bearing against the flange, an exterior radial surface of the body designed to support itself against the counter flange's reaction surface, an interior radial surface designed to support itself against the exterior radial surface of the straight spigot, and a forward extremity of the heel being designed to press itself to the flange to insure waterproofness of the connection between the two pipeline elements, characterized in that the body presents at least one recess or section for accommodating the expansion of the elastomer of the compressed gasket, and that the gasket is equipped with a means to limit the radial expansion of the heel toward the outside.

According to the particular modes of implementation, the device may contain one or many of the following characteristics:

The recess is an annular recess formed on the exterior or interior radial surface of the body.

The recess is formed on the interior radial surface of the body. This recess defines a cavity at least partially closed by a part of the gasket forming an annular lip, and the device contains an element which is able to maintain this lip against the exterior radial surface of the straight spigot end, this element being lodged in said cavity.

This element is a split O-ring.

The recess is created on the interior radial surface of the body, and at least one more annular recess is created in the exterior radial surface. These two recesses are axially offset one from the other.

The means to limit the exterior expansion of the heel is a rigid ring, actually metallic, set on the radial exterior of the heel.

The means to limit the expansion of the heel is an annular spring arranged in an exterior radial section of the heel.

The forward extremity surface of the heel has at least one part which angles toward the rear, in order to focus the pressure in a forward radially inner section of the heel during compression, therefore insuring the limitation of the radial expansion of the heel toward the outside.

The exterior radial surface of the body has a form generally tapered toward the end of the gasket.

A front part of the exterior radial surface of the body, which has no grooves or recesses, slopes forward. This forward section is designed to rest against the corresponding reactive section of the counter flange during the compression of the gasket.

At least two parts of the exterior radial surface of the body, without recesses, slope toward the front, respectively, a rear section and the forward section, and the forward section diverges more steeply than the rear section, these two sections being designed to press against the corresponding surface reaction sections of the counter flange during the compression of the gasket.

The interior radial surface of the heel has at least two radial projections forming axial positioning wedges for the device on the straight spigot. These wedges are designed to abut the axial extremity of the straight spigot before the compression of the gasket.

The device consists of at least two metallic blocking inserts, set in the rear section of the body, each insert presenting an interior radial surface with catching relief designed to press against the exterior radial surface of the straight spigot to lock the assembly of the two pipes during gasket compression.

At least one rear frontal recess for the expansion of the elastomer is set between the inserts in a surface at the rear of the body, and At least one blocking insert shows a slightly radial projection on a radial exterior surface. This projection is designed to cooperate with a butting area that is slightly radial to the surface of reaction of the counter flange to limit the radial movement of the insert during gasket compression.

The invention also aims to provide a waterproof connection between pipeline elements, comprising a straight spigot of a first pipe, a flanged end of a second pipe, and a counter flange surrounding the spigot end and secured to the flange, characterized by the fact that it contains a device such as described above, the mentioned exterior radial surface of the body pressing against a reaction surface of the counter flange, the mentioned interior radial surface of the body pressing on the exterior radial surface of the straight spigot, and the mentioned forward extremity heel surface pressing against the flange, insuring the waterproofness of the assembly between the two pipes.

The invention has finally for goal a waterproof locking assembly between two pipes, comprising a straight spigot of a first pipe, a flanged end of a second pipe, and a counter flange surrounding the spigot end and secured to the flange, characterized by the fact that it contains a device such as described above, the mentioned exterior radial surface of the body pressing against an angled reaction surface of the counter flange, the mentioned interior radial surface of the body as well as the catching reliefs of the inserts pressing against the exterior radial surface of the straight spigot, and the mentioned forward extremity heel surface pressing against the flange, insuring the waterproofness and locking of the assembly between the two pipes.

BRIEF DESCRIPTION OF THE DRAWINGS

The invention will be better understood during the following lecture of the description, given uniquely as an example, and referring to the annexed drawings in which:

FIG. 1 is a longitudinal sectional view of a pipe setup containing the invented device. The top half view shows the assembly prior to compression of the gasket, and the lower half view shows the assembly after the compression of the gasket.

FIG. 2 is an enlarged view of the encircled part I of FIG. 1.

FIG. 3 is a partial longitudinal sectional view, illustrating the longitudinal section of a variant of the device before compression.

FIG. 4 is a view similar to FIG. 1 illustrating a pipe assembly with the variant pictured in FIG. 3.

DETAILED DESCRIPTION OF THE PREFERRED EMBODIMENTS

Figure 5:
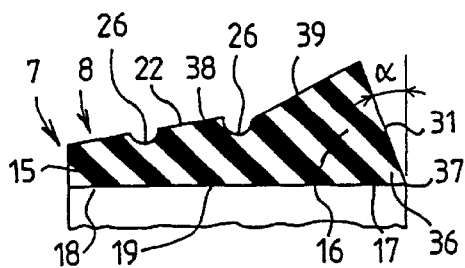
FIGS. 5 to 7 are partial views of longitudinal sections, each illustrating a pre-compression variant of the device pictured in FIG. 1.

On the upper half view of FIG. 1 is represented a straight spigot 1 or male end of a first pipe 2 and a flange 3 of a second pipe 4 ready to be assembled. These pipes, slightly laid out coaxially, can be the successive pipes of a pipe system, notably of ductile cast iron, each pipe made with one straight spigot 1 at one end and with a flange 3 at the other.

The flange 3 extends radially from the rear extremity 5 (at the left on FIG. 1) of pipe 4 and is pierced of orifices 6 evenly spread out angularly.

A device 7, made of a sealing gasket 8 and of a continuous metal ring 9, encircles the front extremity 10 (to the right on FIG. 1) of the straight spigot 1.

A counter flange 11, encircling the straight spigot 1, is initially placed to the rear of the gasket 8. This counter flange 11 contains a rear section 12 that is slightly truncated, tapered toward the front and slightly coaxial to pipe 2. The section 12 is axially lengthened toward the front by an intermediary section 12A that is less tapered. On the forward extremity of this last section a collar or buckle 13 juts out toward the exterior and is pierced by orifices 14, evenly spread to match the orifices 6. Bolts that are not shown go through the orifices 6 and 14 placed face to face.

The gasket 8 is made of elastomer and has an annular body 15 and at its front extremity, an annular heel 16 that has a slightly rectangular cross-section.

As shown in FIG. 2, the cylindrical interior radial surface 17 of the heel 16 is an extension of the cylindrical interior radial surface 18 of the body 15, so much so that the interior radial surface 19 of the gasket 8 is cylindrical. This surface 19 is pressing against the exterior radial surface 20 of the straight spigot 1.

A radially exterior annular part 21 of the heel 16 protrudes radially toward the outside from the exterior radial surface 22 of the body 15. This surface 22 is linked to the exterior radial surface 23 of the heel 16 by a radial shoulder ring 24.

An annular score 25 running into the shoulder 24 is placed in portion 21. The inside diameter of the score 25 is slightly less than the diameter of the surface 22 in front of the body 15.

The surface 22 of the body 15 has a generally frustoconical form, tapered toward the rear extremity of the gasket 8, with a tapering angle mostly constant relative to the axle of the gasket 8. Three identical annular recesses 26, with a semicircle cross-section, and axially apart from one another, are made in surface 22.

The rear portion 12 of the counter flange 11 presents an interior surface 27 tapered toward the rear extremity 28 of the counter flange 11. The middle section 12A presents an interior surface 27A substantially conjugate with the surface 22. Surfaces 27 and 27A form a reaction surface.

We now describe the assembly of the two pipes.

In a waiting position, as pictured in the upper half-view of FIG. 1, the inner face 27A of the intermediary section 12A of the flange is placed in contact with the rear section of the surface 22 of the body 15, the gasket 8 not being under pressure.

The end 29 of the straight spigot 1 is mostly flat and is on contact with the rear surface 30 of the flange 3.

The forward surface 31 of the heel 16 is mostly flat and the gasket 8 is positioned on the straight spigot 1 in such a manner that the surface 31 is in contact with surface 30, also flat, of the flange 3. The axial difference between the two pipes 2 and 4 is therefore nonexistent or nearly so.

The inside diameter of the rear extremity 28 of the counter flange 11 is just slightly greater than the outside diameter of the straight spigot 1, the diametrical difference between the counter flange 11 and the straight spigot 1 being then minimal. The interior surface 27, 27A of the counter flange 11 delimits a compression chamber 32 around the straight spigot 1.

To waterproof the assembly of pipes 2 and 4, the bolts that link the counter flange 11 to the flange 3 are tightened, producing a forward movement of the counter flange.

The lower half-view of FIG. 1 shows pipes 2 and 4 as assembled after the tightening of the bolts. The gasket is therefore compressed between the flange 3 and the counter flange 11, surface 22, deformed, presses against the reaction surface 27, 27A, surface 19 is pressed on surface 20 of the straight spigot and surface 31 of the heel 16 presses against surface 30 of the flange 3.

The body 15 is then almost entirely lodged in the watertight chamber 32. The recesses 26 are no longer visible because of the deformation of the elastomer.

The recesses 26 have provided expansion space for the elastomer during the compression of the gasket 8, allowing the body 15 to fit almost entirely into the chamber 32.

The buckle 13 has been brought as close as possible to the flange 3, thus limiting the free space available for the radial expansion of the heel 16 during the compression of the elastomer. This radial expansion has also been limited by the presence of the ring 9 which radially holds part 21 of the heel 16.

These conditions, this is to say when then axial and diametrical plays are at a minimum, are the most severe when trying to achieve a good water seal. In fact, under these conditions, there is at our disposal a relatively large quantity of elastomer for a rather small expansion space.

More precisely, using gaskets with grooveless bodies, we notice, under the same conditions, that the body 15 does not penetrate totally into the chamber 32. The distance between the buckle 13 and the flange 3 is thus greater than with the device on FIG. 1, and we then notice an uncontrolled widening of the heel 16 toward the outside, notably during the pressurization of pipes 2 and 4, which can lead to leaks between the surface 31 of the heel and surface 30 of the flange.

To the opposite, such a widening, under pressurization, is forcefully blocked by the combined effects of the recesses 26 and of the ring 9 in the device as described in FIG. 1.

With the device of FIG. 1, waterproofness is perfect at minimal axial or diametrical plays, and remain satisfactory when such play becomes substantial.

Furthermore, the device of FIG. 1 is particularly economical to implement, since it is constituted by a gasket 8 made of only one piece of elastomer to which is joined a metal ring 9 retained in the score 25. The recesses 26 not only facilitate the assembly of the pipes by diminishing the friction of the gasket on the surfaces 27 and 27A of the counter flange, but they also facilitate the disassembly of the counter flange 11, as the gasket 8 detaches itself more easily from these surfaces when recesses are present.

Ring 9 is more generally an adapted rigid ring designed to insure the limitation of the heel's exterior radial expansion. This ring can also be replaced by an helicoidal spring ring fitted inside score 25 or sunk in the heel 16. Also, the heel itself can be molded directly onto the ring or the spring.

FIG. 3 represents a partial longitudinal sectional view of a variation on the device in FIG. 1. This device consists uniquely of a gasket 8, which is distinguishable from the gasket in FIG. 1 only by the shape of its heel 16. Its heel 16 fully extends the body 15 of the gasket 8, without radial projection to the outside, this is to say that the exterior radial surface 33 of the gasket 8 is of a generally tapered shape toward the rear with an angle of convergence nearly constant in relation to the axis of gasket 8, from its front extremity to its rear extremity.

The forward side 34 of the front recess before 35 is in a mostly linear slope, thus augmenting the axial size of this recess in relation to the two other recesses 26 of semicircular cross-section.

The surface 31 of the heel 16 is angled from the radial plane by angle $\alpha$, a nearly constant angle. This surface 31 is substantially frustoconical and converges toward the forward extremity of the heel.

This last characteristic allows us to obtain a hardening of the interior radial section of the front of the heel 16 when surface 31 presses against surface 30 of the flange 3 as represented on the lower half-view of FIG. 4.

Before assembly, as represented by the upper half-view of FIG. 4, the interior radial edge 37 of surface 31 is the only one in contact with surface 30 of the flange 3. As the tightening of the bolts linking the flange 3 to the counter flange 11 occurs, the section 36 of heel 16 compresses as the rest of surface 31 progressively presses against surface 30 of the flange 3. After the tightening of the bolts, there is therefore a concentration of the compression force in section 36 of the heel 16.

When pipes 2 and 4 are pressurized, this section 36 offers a greater resistance to the pressure of the fluid that is trying to spread the heel 16 toward the outside, than in the case of a classical gasket 8 without a heel 16 radial expansion limitation mechanism and with a surface 31 slightly radial.

Furthermore, this configuration of surface 31 tends to guide heel 16 elastomer deformation inward during the tightening of the bolts, especially when the axial play between the straight spigot 1 and the flange 3 is not null. The angle $\alpha$ may typically be 15°.

FIG. 5 illustrates another variation of device 7, distinguished from that of FIG. 3 in that two recesses 26 are made on the surface 22 of the body 15 and in that the surface 22 presents from the front two successive sections 38 and 39 of generally tapered shape toward the rear and whose angles of convergence in relation to the axis of the gasket 8 are different. The forward section 39 is more convergent than the rear section 38, and the junction between the two sections 38 and 39 is at the level of the forward recess 26.

These two sections 38 and 39 are designed to press against roughly corresponding slope sections, to the rear and front of the intermediary surface 27A of the counter flange 11. During the tightening of the bolts, section 39 presses against surface 27A of counter flange 11, thus forcing the heel 16 radially toward the inside, and participates, after the tightening, along with surface 31 of the heel 16, to the limitation of the exterior radial expansion of the heel 16 while improving the waterproofness of the bond between the heel 16 and the flange 3.

Figure 6:
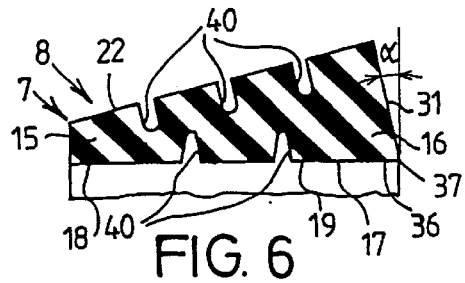

FIG. 6 illustrates another variance of the device, distinguished from that of FIG. 3 in that the annular recesses 40 are planned both on surface 22 and on surface 18 of the body of the gasket 8. The recesses 40 are deeper and narrower that the recesses 26 of FIG. 3. The recesses 40 are axially offset one from another, gasket 8 having a configuration in the shape of a bellows.

Figure 7:
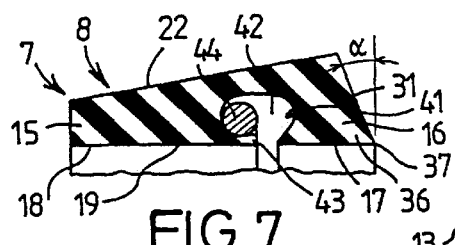

FIG. 7 presents another variation of the device which distinguishes itself from that represented on FIG. 3 in that there is only one annular recess 41 made in the surface 18 of the body 15.

This recess 41 defines an annular cavity 42 partially closed toward the rear by a part 43 of the gasket 8 forming an annular lip. A split O-ring 44 of hard plastic or metal is lodged into this cavity 42 and takes support against the lip 43.

During the compression of the gasket, the O-ring 44 is pressed against the lip 43 by the exterior radial section of the body 15, and it thus maintains the lip 43 in pressure against the surface 20 of the straight spigot 1 to insure a good waterproofness of the pipe 2 and 4 assembly. Simultaneously, the recess 41 offers an expansion area for the elastomer which comes to close the cavity 42 around the O-ring 44, allowing the near complete insertion of the body 15 into the waterproofing chamber 32.

Figure 8:
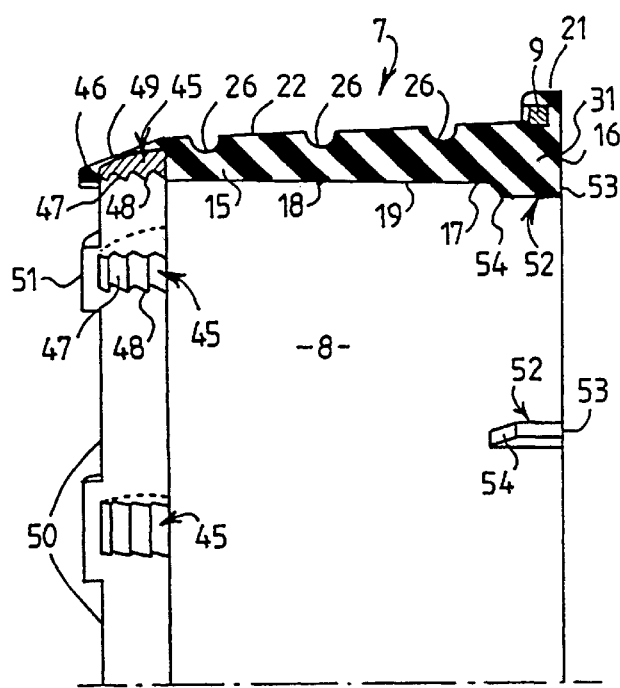
FIG. 8 is a longitudinal sectional half-view of a second type of setup of the invention. This view is taken from a diametric plane passing through a locking insert and a device positioning wedge.

FIG. 8 illustrates another mode of implementation of the device, distinguishing itself from that of FIG. 1 in that it contains metal locking inserts 45 sunk into the rearmost section 46 of the body 15 of the gasket 8.

These inserts 45 are blocks spread regularly and angularly and linked around by the body 15. They present an interior radial surface 47 with catching teeth 48. These teeth 48 are designed to bite the surface 20 of the straight spigot 1 to lock the assembly between pipe 2 and 4.

The exterior radial surface 49 of the section 46 is more strongly tapered than the surface 22 of the body 15.

Some recesses 50 are made in the rear frontal surface 51 of the body 15 between the inserts 45, so that this surface 51 presents axial offsets advancing axially substantially up to the extremity level of each insert 45.

The surface 17 of the heel 16 presents identical projections 52 forward regularly spread angularly. These projections 52 are trapezoidal section blocks whose front surface 53 prolongs the radial surface 31 of the heel 16 and whose rear surface 54 is inclined radially toward the outside and axially toward the rear.

Figure 9:
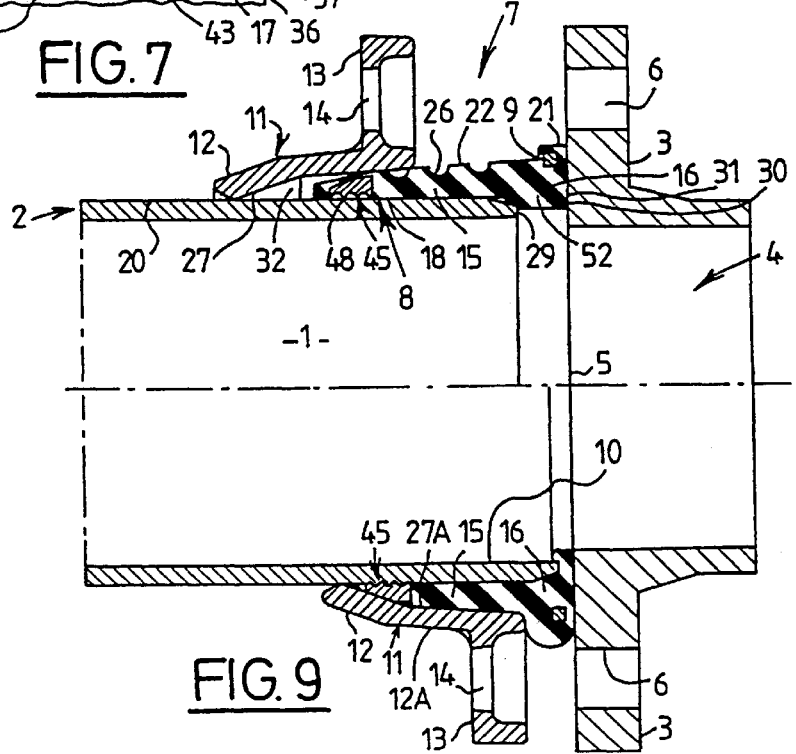
FIG. 9 is similar to FIG. 1, illustrating a pipe assembly containing the device from FIG. 8.

These projections 52 form positioning wedges that allow the preserving of a minimal gap between the forward extremity 10 of the straight spigot 1 and surface 30 of the flange 3 before tightening of the bolts, as shown in the upper half-view of FIG. 9. In contrast with the configuration of FIG. 1, the axial play between pipes 2 and 4 is no longer minimal.

During assembly (FIG. 9), the gasket 8 is fitted over the tip of the straight spigot 1, the surfaces 54 of the wedges 52 apply pressure on the forward extremity of the straight spigot 1, which is now beveled, and the surface 31 of the heel 16 and the surfaces 53 of the wedges press against surface 30 of the flange 3.

It is necessary to preserve such a minimal gap before the tightening of the bolts so as to insure the integrity of the water seal independently of the locking mechanism. The locking between pipes 2 and 4 is achieved during the tightening of the counter flange to the flange by cooperation between the surface 27 of the counter flange 11 and the exterior radial surfaces of the inserts 45, which are thus pushed axially forward and radially toward the inside.

In addition to the automatic positioning of the gasket 8 on the straight spigot 1, the wedges 52 also allow a correction of a possible warping of the slice 29 of the straight spigot 1.

The fact that surfaces 54 are at an angle allow the optimization of the montage with slice 29 of the straight spigot 1 end whether it is beveled or not.

Thus, if the edge 29 of the straight spigot 1 end is beveled, the surfaces 54 of the wedges 52 will cooperate with the bevel represented in FIG. 9, the bevel of the straight spigot thus offering additional expansion space to the elastomer with minimal diametrical play.

The presence of recesses 50 between the inserts 45 allows the increasing of the waterproofness of the assembly at the inserts 45 level and facilitates the disassembly of the setup.

Thus, with minimal diametrical play, as represented in FIG. 9, these recesses 50 prohibit the formation of rolls of excess elastomer to the exterior of the counter flange 11 (to the rear of this one).

These recesses 50 later facilitate disassembly of the counter flange 11, which is easier when there are no excess rolls, and also augment the tolerance for angular deviation between the straight spigot 1 and flange 3.

Furthermore, these recesses 50 prohibit the undulation of the elastomer, with minimal diametrical play, at the level of surface 22 of the gasket and near the inserts 45, such an undulation possibly causing weaknesses in the waterproofing and triggering corrosion of the inserts 45 by the outside environment.

The recesses 26 facilitate and better the locked assembly of the pipes while limiting friction between the body of the gasket 8 and the counter flange 11.

Figure 10:
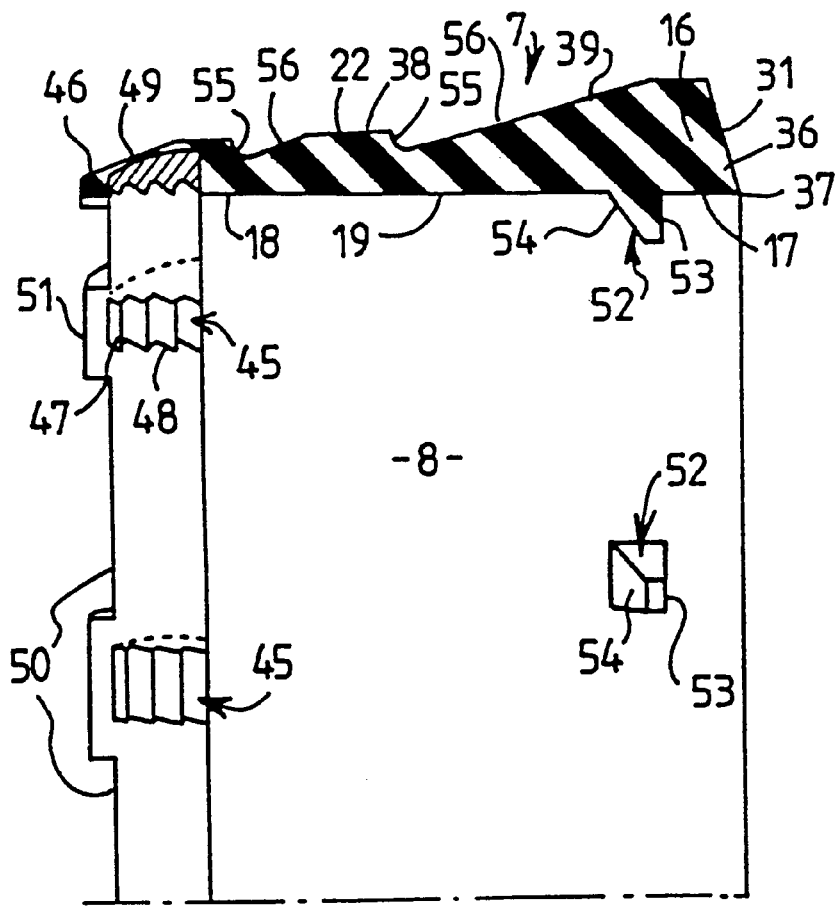
FIG. 10 is similar to FIG. 8, illustrating a variation of the setup shown in FIG. 8

FIG. 10 represents a half-view in longitudinal section of a variation of the device of FIG. 8, whose heel 16 and the surface 22 of the gasket have a similar configuration to that of the gasket pictured in FIG. 5.

The device of FIG. 10 distinguishes itself from that of FIG. 8 in that the surface 31 of the heel 16 is at an angle relative to the radial plane, like those of FIGS. 5 to 7, and in that the surface 22 of the gasket 8 presents, forward of the inserts, two sections 38 and 39 of different convergent angles in relation to the axis of the gasket, such as in FIG. 5, and further in that the forward surfaces 53 of the wedges 52 are located to the rear of the forward edge 37 of the surface 31 of the heel 16.

Furthermore, only two annular recesses 55 are made on the surface 22 of the body. The junction between the two parts 38 and 39 occurs at the level of the forward recess 55.

The forward sides 56 of the recesses 55 are angled in a slightly linear way, so that the axial length of these recesses 55 is greater than those of recesses 26 of the gasket in FIG. 8. The side 56 of the front recess 55 meets and follows part 39 of the surface 22.

In a similar way to the variation of FIG. 4, the angled surface 31 of the heel 16 insures a rigidification of the heel during the tightening of the gasket by the counter flange 11. This angled surface 31 insures, in combination with part 39 of the surface 22, the limitation of the radial expansion of the heel 16 during the pressurization of the pipes 2 and 4. Furthermore, the surface 31 guides the expansion of the elastomer radially toward the inside during the compression of the gasket 8.

Also, the gap between the surfaces 53 of the wedges 52 and the edge 37 of the surface 31 of the heel 16 allows the availability of an additional free space for the expansion of the elastomer during the compression of the gasket 8.

Figure 11:
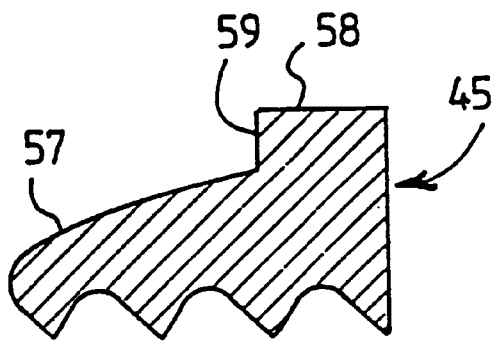
FIG. 11 is a longitudinal sectional view of a variant of an insert for a device shown from FIG. 8 to FIG. 10.

FIG. 11 is a longitudinal sectional view of an insert 45 adapted to be used in a device similar to those of FIG. 8 or 10, in the event the straight spigot 1 is made of plastic.

The exterior radial surface 57 of the insert 45 shows at the front a radial ledge 58 linked to surface 57 by a slightly radial shoulder abutment 59. Such inserts 45 are designed to be sunk within the section 46 of a gasket 8, as shown on FIGS. 8 to 10.

The shoulder 59 of each insert 45 of such a gasket is designed to cooperate with a slightly radial corresponding section of the reaction surface 27 of the counter flange 11, during the compressing of the gasket.

Thus, we control the radial movement of the inserts 45 during the tightening of the counter flange, avoiding in particular too deep a radial penetration of the inserts in the straight spigot which can lead to the deterioration or even puncture of the straight spigot.

What is claimed is:

1. A pipe assembly, comprising:
   a first pipeline element (2) having a straight spigot (1);
   a counter flange (11) provided around the straight spigot (1) and having a reaction surface (27, 27A) that faces toward the straight spigot;
   a second pipeline element (4) having a flange (3);
   a tightening element connecting the counter flange (11) and the second pipeline element (4) together, and operative to move the counter flange (11) toward the second pipeline element (4); and
   an elastomer gasket having
      i) a support body (15) having an exterior radial surface (22) for bearing against the reaction surface (27, 27A) of the counter flange (11), and an interior radial surface (18) for bearing against an exterior radial surface (20) of the straight spigot (1), and
      ii) a support heel (16) having a forward extremity surface (31) for bearing against the flange (3);
   wherein the support body (15) is provided with at least one recess (26, 35, 40, 41, 55) for the expansion of the elastomer gasket, and the elastomer gasket includes means for limiting the exterior radial expansion of the heel (16).

2. The pipe assembly according to claim 1, wherein the recess is an annular recess on one of the exterior radial surface of the body (15) and the interior radial surface of the body (15).

3. The pipe assembly according to claim 2, wherein the recess (40) is made on the interior radial surface (18) of the body (15), at least one other recess (40) is made on the exterior radial surface (22) of the body (15), and these two recesses (40) are axially separated in relation to one another.

4. The pipe assembly according to claim 2, wherein the recess (41) is provided on the interior radial surface (18) of the body (15), the recess (41) defining a cavity (42) at least partially closed by a part of the gasket forming an annular lip (43), and the gasket (8) contains an element (44) for maintaining the lip (43) on the exterior radial surface (20) of the straight spigot (1), the element being lodged in the cavity (42).

5. The pipe assembly to claim 4, wherein the element is a split O-ring (44).

6. The pipe assembly according to claim 1, wherein the limiting means is rigid metallic ring (9), located in a exterior radial section (21) of the heel (16).

7. The pipe assembly according to claim 1, wherein the limiting means is an annular spring placed in a exterior radial section of the heel.

8. The pipe assembly to claim 1, wherein the forward extremity (31) of the heel (16) has an angled surface, to concentrate, during the compression of the gasket (8), the compression force in a forward interior radial area (36) of the heel, thus insuring the limitation of the radial expansion of the heel toward the outside.

9. The pipe assembly according to claim 1, wherein the exterior radial surface (22) of the body has a general form that tapers away from the second pipe element (4).

10. The pipe assembly according to claim 1, wherein a forward section (39) of the exterior radial surface (22) of the body, without recesses, tapers away from the second pipe element (4), and is designed to press against a corresponding part of the reaction surface (27, 27A) of the counter flange (11) during the compression of the gasket (8).

11. The pipe assembly according to claim 10, wherein at least two sections (38, 39) of the exterior radial surface (22) of the body, without recesses, taper away from the second pipe element (4), respectively, and the forward section (39) tapers more steeply than a rear section (38), these two sections being designed to press against the corresponding reaction surfaces (27, 27A) of the counter flange (11) during the compression of the gasket (8).

12. The pipe assembly according to claim 1, wherein the interior radial surface (17) of the heel (16) presents at least two radial projections (52) forming axial positioning wedges on the straight spigot (1), the wedges (52) being designed to abut against an axial extremity (10) of the straight spigot (1) before the compression of the gasket (8).

13. The pipe assembly according to claim 1, further comprising at least two locking metallic inserts (45), set in the body (15) rear extremity section (46), each insert presenting an interior radial surface (47) on which a catching relief (48) is designed to press against the exterior radial surface (20) of the straight spigot (1) to lock the assembly of the two pipe elements (2,4) during the compression of the gasket (8).

14. The pipe assembly according to claim 13, wherein at least one rear frontal recess (50) for elastomer expansion of the gasket (8) is made between the inserts (45) in a rear extremity surface (51) of the body (15).

15. The assembly according to claim 13, wherein at least one locking insert (45) presents on an exterior radial surface (57) a slightly radial projection (58) designed to cooperate with a section of slightly radial abutments on the reaction surface (27, 27A) of the counter flange (11) in order to limit the radial movement of the insert (45) during the compression of the gasket (8).

16. A waterproof and locked assembly of pipe elements, comprising a straight spigot (1) of a first pipe element (2), a flange (3), of a second pipe element (4), and of a counter flange (11) encircling the straight spigot (1) and secured to the flange (3), wherein the assembly contains one device (7) according to claim 13, said exterior radial surface (22) of the gasket (8) pressing against a sloped reaction surface (27, 27A) of the counter flange (11), said interior radial surface (18) of the body (15) as well as the catching reliefs (48) of the inserts (45) pressing against the exterior radial surface (20) of the straight spigot (1), and said forward extremity surface (31) of the heel (16) pressing against the flange (3) to insure the waterproofness and the lock of the assembly of the two pipe elements.

17. A waterproof assembly of pipe elements, comprising a straight spigot (1) of a first pipe element (2), a flange (3) of a second pipe element (4), and a counter flange (11) encircling the straight spigot (1) and secured to the flange (3), wherein the assembly contains one device (7) according to claim 1, said exterior radial surface (22) of the body (15) pressing against a reaction surface (27, 27A) of the counter flange (11), said interior radial surface (18) of the body (15) pressing against the exterior radial surface (20) of the straight spigot (1), and said forward extremity surface (31) of the heel (16) pressing against the flange (3), assuring the waterproofness of the assembly of the two pipe elements.

* * * * *